United States Patent
Zeiler

(10) Patent No.: US 7,080,412 B2
(45) Date of Patent: Jul. 25, 2006

(54) INSECT BARRIER GARMENT

(75) Inventor: Bernhard Zeiler, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 953 days.

(21) Appl. No.: 09/738,526

(22) Filed: Dec. 15, 2000

(65) Prior Publication Data

US 2002/0124293 A1 Sep. 12, 2002

(51) Int. Cl.
A42B 3/00 (2006.01)

(52) U.S. Cl. .............................. 2/4; 2/69; 2/455; 2/456
(58) Field of Classification Search ..................... 2/455, 2/456, 69, 84, 900, 4
See application file for complete search history.

(56) References Cited

U.S. PATENT DOCUMENTS

| | | | |
|---|---|---|---|
| 499,965 A | 6/1893 | Bushnell | |
| 640,412 A | 1/1900 | Petersen | |
| 1,203,155 A | 10/1916 | Strout | |
| 2,074,390 A | 3/1937 | Green | 449/61 |
| 2,344,811 A | 3/1944 | Gill | 2/2 |
| 3,191,185 A | 6/1965 | Martin | 2/22 |
| 3,783,451 A | 1/1974 | Malin | 2/4 |
| 4,395,781 A | 8/1983 | Myers | 2/4 |
| 4,537,816 A | 8/1985 | Booth et al. | 428/234 |
| 4,685,152 A | 8/1987 | Heare | 2/4 |
| 4,716,594 A | 1/1988 | Shannon | 2/4 |
| 4,923,743 A | 5/1990 | Stewart, Jr. | 427/288 |
| 5,102,725 A | 4/1992 | Knox et al. | 428/245 |
| 5,175,034 A | 12/1992 | De La Porte et al. | 428/36.1 |
| 5,214,797 A | 6/1993 | Tisdale | 2/2 |
| 5,249,307 A | 10/1993 | Lemoine | 2/84 |
| 5,341,511 A | 8/1994 | Wells | 2/2 |
| 5,357,635 A * | 10/1994 | Lemoine | 2/84 |
| 5,383,235 A | 1/1995 | Peters | 2/115 |
| 5,385,036 A | 1/1995 | Spillane et al. | 66/87 |
| 5,539,930 A | 7/1996 | Sesselmann | 2/243.1 |
| 5,591,933 A | 1/1997 | Li et al. | 89/36.02 |
| 5,600,850 A * | 2/1997 | Shannon | 2/69 |
| 5,713,076 A * | 2/1998 | Davis | 2/4 |
| 5,717,990 A * | 2/1998 | Alquist et al. | 2/4 |
| 5,720,047 A | 2/1998 | Spitzer | 2/161.1 |
| 5,794,263 A | 8/1998 | Carman | 2/84 |
| 6,103,641 A | 8/2000 | Gehring, Jr. | 442/46 |
| 6,145,348 A | 11/2000 | Hardegree et al. | 66/192 |

FOREIGN PATENT DOCUMENTS

| | | |
|---|---|---|
| GB | 963960 | 7/1964 |
| GB | 2 108 822 A | 5/1983 |

* cited by examiner

Primary Examiner—John J. Calvert
Assistant Examiner—Robert H. Muromoto, Jr.
(74) Attorney, Agent, or Firm—Terry Moyer; Jeffery E. Bacon

(57) ABSTRACT

Lower body, upper body, and hood garments formed of a textile that inhibit the ability of insects or small animals to bite or sting the wearer. The textile of the garments have a base fabric and a cover fabric separated by a spacer layer. The base fabric is open to facilitate breathability. The cover fabric is sufficiently closed to inhibit insects, spiders, or other small animals from passing through the cover fabric, and sufficiently open so as not to inhibit the breathability of the textile. The spacer layer separates the base fabric from the cover fabric with sufficient distance to inhibit insects, spiders, or other small animals from probing through the textile to reach the wearer.

34 Claims, 1 Drawing Sheet

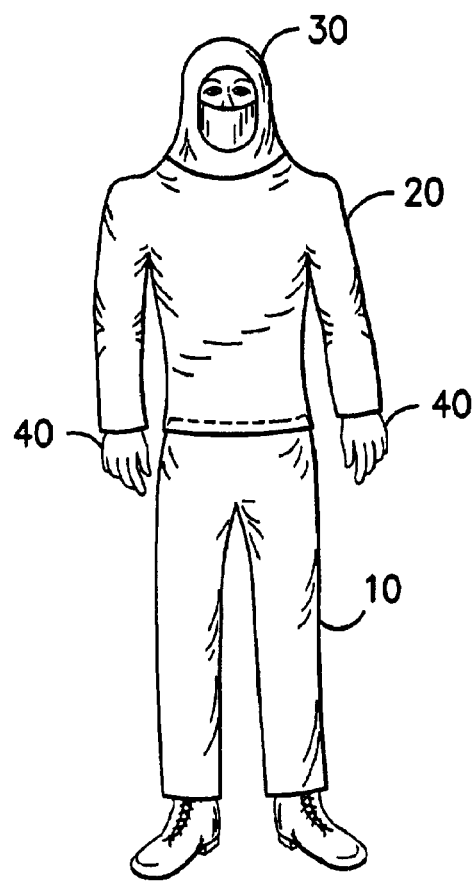
FIG. -1-
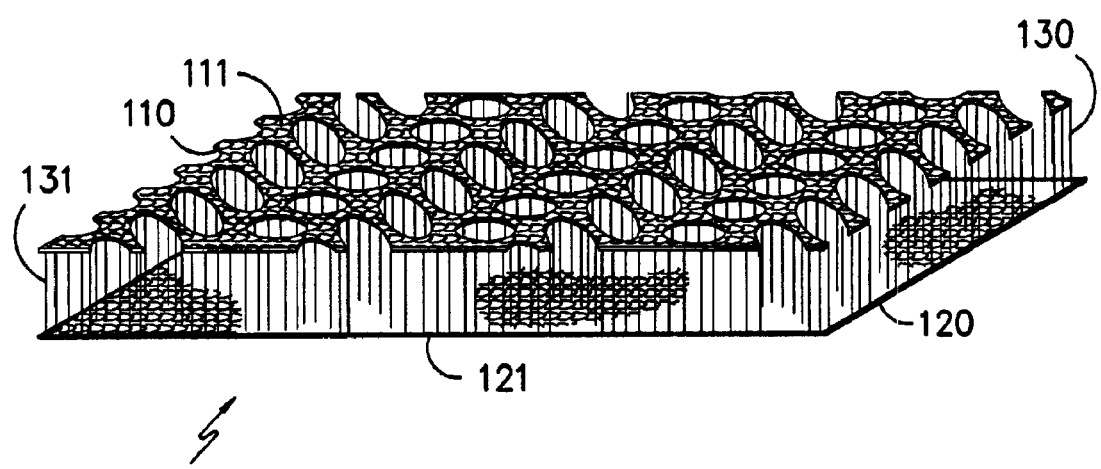
FIG. -2-

INSECT BARRIER GARMENT

BACKGROUND

The present invention relates to protective fabrics and garments, and in particular, to fabrics and garments that assist in protecting the wearer from the stings or bites of insects.

Net-like fabrics exist for creating a barrier to inserts. However, these net-like barrier fabrics do not typically prevent an insect from probing through the fabric to reach the user of the fabric when the fabric is adjacent to the skin of the user. Garments have been formed from these net-like barrier fabrics that use an inner net material with a greater open area adjacent to the wearer. However, the large open area of the inner net does not keep the outer net-like barrier fabric a sufficient distance from the wearer to prevent the insect from probing through the barrier fabric and reaching the wearer, particularly in the open areas of inner net like material when the garment is subjected to stress such as during bending movements of the wearer. Therefore, there is a need for textiles that can provide a barrier to insect when the textile is adjacent to the user.

BRIEF DESCRIPTION OF THE DRAWINGS

FIG. 1 is an elevational view of a person using various garments of the present invention; and FIG. 2 is an enlarged partial perspective view of a textile incorporating one embodiment of the present invention.

DETAILED DESCRIPTION

The present invention is a textile and articles of clothing, or garments, made from the textile herein that help protect the wearer from being stung or bitten by various mosquitoes or other insects, spiders or other small animals. A garment made from this fabric can lay directly against the wearer's skin and still be effective in helping to preventing insect bites or stings. The fabric uses no chemical insect repellants that would eventually wash off or smell. The fabric is very light weight, and has an open construction that breathes, allowing the wearer to remain cool. These latter features of breathability and light weight are very important because mosquitoes and most other stinging or biting insects live in hot humid environments.

Referring now to FIG. 1, there is shown an elevational view of a person using various garments of the present invention. The particular garments illustrated in FIG. 1 include, a lower body cover 10, an upper body cover 20, a head covering 30, and hand covers 40. The lower body cover 10, upper body cover 20, head cover 30 and hand covers 40 are generally formed of a protective textile. The lower body cover 10 is adapted to cover the waist, pelvic regions, and legs (including ankles or not) of the wearer. The lower body cover 10 can include gathers at the waist and/or ankles of the wearer, such as elastic regions or draw cords at those locations. The upper body cover 20 is adapted to cover the waist, upper torso region, and arms (including wrists or not) of the wearer. The upper body cover 20 can include gathers at the waist and/or wrists of the wearer, such as elastic regions or draw cords at those locations. The upper body cover 20 is adapted to cover the waist, upper torso region, and arms of the wearer. The head covering 30 can be a hood, a cap with a protective veil, or the like. The hand covers 40 can be gloves, mittens, or any other device adapted to cover the hands of the wearer, and can also cover a portion of the wrist of the wearer. The hand covers 40 can include gathers at the wrists of the wearer, such as elastic regions or draw cords at those locations.

Although only lower body cover 10, upper body cover 20, head covering 30, and gloves 40 are illustrated in FIG. 1, the garments of the present invention may include jackets, pants, jumpers, hoods, gloves or mittens, hats, socks, one-piece garments, etc. The garments can be worn under or over existing clothing to give additional protection to the wearer. A person may wear only one, or some, of the garments to achieve additional protection in only the desired areas. Additionally, one, some, or all of the garments can be combined into a more complete protective suit.

Referring now to FIG. 2, there is shown an enlarged, partial view of a protective textile 100 used in the lower body cover 10, upper body cover 20, hood 30 and hand covers 40 illustrated in FIG. 1. The textile 100 generally includes a base fabric 110 and a cover fabric 120, separated by a spacer layer 130.

The base fabric 110 has an inner surface 111 disposed away from the spacer layer 130 of the textile 100. The inner surface 111 of the base fabric 110 is also the side of the textile 100 that would be used as the inner surface of a garment made from the textile 100. In the embodiment illustrated in FIG. 2, the base fabric 110 is an open mesh or net-like construction to provide high air permeability, and can be formed using various constructions such as woven, knitted, nonwoven, or the like. However, the base fabric 110 could also be a solid construction textile, using various constructions such as woven, knitted, nonwoven, or the like.

The cover fabric 120 has an outer surface 121 disposed away from the spacer layer 130 of the textile 100. The outer surface 121 of the cover fabric 120 is also the side of the textile 100 that would be used as the outer surface of a garment. In the embodiment illustrated in FIG. 2, the cover fabric 120 is a solid construction with sufficient openness of the net-like interstices in the fabric to provide high permeability, yet sufficient tightness to provide a barrier to small insects. The cover fabric 120 can be formed using various constructions such woven, knit, nonwoven, or the like. The size of the interstices can be designed to accommodate for different minimum insect size, and/or breathability requirements. In one embodiment the interstices have a maximum passable width of up to about 0.188 inches. Maximum passable width shall be defined as the diameter of the largest spherical gauge that can pass through the opening. In another embodiment, the interstices have a maximum passable width of up to about 0.063 inches. In these embodiments, the base fabric 120 can have a minimum passable width of about 0.188 inches, and/or a minimum passable width of 0.063 inches, respectively.

The spacer layer 130 provides a separation between the base fabric 110 and the cover fabric 120 to inhibit the ability of an insect, spider, or other small animals from probing through the textile 100 to reach the wearer. The spacer layer 130 can also connect the cover fabric 120 with the base fabric 110. The spacer layer 130 provides sufficient compression resistance to maintain the separation property during use of a garment formed from the textile 100. In the embodiment illustrated in FIG. 2, the spacer layer 130 is a layer of pile yarn 131 connecting the base fabric 110 with the cover fabric 120. In another embodiment, open cell foam or closed cell foam could be used as the spacer layer between base inner and outer layers of fabric. The three layers could be joined by sewing/quilting or adhesive bonding or by various plastic welding methods. In yet another embodiment, nonwoven batting material, such as spun or filament, can be used as the spacer layer 130 between the base fabric 110 and cover fabric 120. The three layers can be joined by sewing/quilting or adhesive bonding or by various plastic welding methods.

The distance between the inner surface 111 of the base fabric 110 and the outer surface 121 of the cover fabric 120 provides the textile 100 with the characteristics of inhibiting the ability of insects, spiders, small animals to probe through the textile 100 in order to bite, sting, or otherwise disturb the wearer. In one embodiment, the thickness is at least about two millimeters. In another embodiment, the thickness is between about three millimeters and about eight millimeters.

A lower weight for the textile 100 provides the wearer with additional comfort. In has been found that a total textile 100 weight of less than 6.5 ounces per square yard provides a cool, highly air-permeable garment.

The textile 100 can be colored to provide concealment to the wearer. Additionally, the coloring can be a pattern, such as a camouflage pattern. One method that can be used for coloring the textile is disclosed in U.S. Pat. No. 4,923,743 issued to Stewart, Jr., on May 8, 1990, and entitled "Apparatus and Method for Spraying Moving Substrates", which is hereby incorporated in its entirety by specific reference thereto. The textile 100 can be dyed or printed. Beam dyeing is the preferred dyeing method in order to prevent loss of thickness during processing. Jet dyeing should be preceded by heat stabilization for the same reason. Pad dyeing is also possible. Printing on the textile 100 can also be accomplished with screen-printing. Pressure at high temperature, such as occurs in heat-transfer printing, causes substantial permanent thickness reduction and should be avoided.

In the embodiment illustrated in FIG. 2, the textile 100 is a spacer fabric, is warp knitted fabric to provide high conformability of the garment to the wearer, and has low fabric-to-fabric noise while in use. However, the textile 100 can also be a woven fabric. Spacer fabrics and their production methods on double hook looms and on double-needle-bar warp knit machines are known, and will therefore not be discussed in further detail.

In the embodiment illustrated in FIG. 2, the base fabric 110 and the cover fabric 120 are constructed using a filament polyester yarn of 70 to 150 denier weight, and the pile yarn 131 is a 30 denier monofilament polyester. It has been found that the 30 denier monofilament polyester yarn provides a good compression resistance to the spacer layer 130, which helps the spacer layer 130 to maintain the thickness property of the textile 100 during use of a garment formed from the textile 100. Additionally, it has been found that the monofilament polyester yarn is economical (as it is produced in high volume), provides an ease of fabrication, allows a lightweight and open (air-permeable) construction, has good colorability, and has inherent antimicrobial functionality (due to the hydrophobic nature of the polymer). In one embodiment the cover fabric 120 is constructed using dull yarn to provide low light reflectivity. The dull yarn and low light reflectivity of the cover fabric 120 can also be obtained through pad application of a suitable binder.

The textile 100 can be formed into the garments of the present invention for the purpose of protecting against insect stings or bites, as illustrated in FIG. 1. The garments are formed with the inner surface 111 of the base fabric 120 being the inner surface of the garment, and the outer surface 121 of the cover-fabric 120 can be of any design suitable for the application. The garments can be formed completely of the protective textile 100, or the garment can be formed with only portions of the garment being the textile 100. For example, the legs of the lower body torso cover 10 can be formed of the protective spacer textile 100, and the waist and pelvic regions of the lower body torso cover 10 can be formed of a different protective material or a standard textile. Similarly, the arms of the upper body torso cover 20 can be formed of the protective spacer textile 100, and the waist and upper torso regions of the upper body torso cover 20 can be formed of a different protective material or a standard textile. Also, the portion of the glove 40 covering the back of the hand and/or the fingers can be formed from the textile 100, and the remainder of the glove 40 (such as the palm) can be formed of a sturdy textile or leather.

When making the head covering 30, a more transparent veil textile is required in front of the wearer's face. The more transparent textile used in a veil may be accomplished by using a more open base fabric, cover fabric, and spacer layer. In another embodiment, only the cover fabric of the textile can be used if the cover fabric is held away from the body by the use of an item such as a visor sewn into the hood, or as part of a cap worn underneath the hood. In yet another embodiment, the veil area of the head covering can be left completely or partially open.

What is claimed is:

1. A barrier garment for a wearer, said garment having at least a portion comprising a textile including: a base fabric having a high air permeability and an inner surface disposed toward the wearer, a cover fabric having air permeability with sufficient tightness to be a barrier to insects and an outer surface disposed away from the wearer, and a spacer layer disposed between the base fabric and the cover fabric;

said spacer layer comprising pile yarn connecting the base fabric with the cover fabric.

2. The barrier garment according to claim 1, further including a camouflage pattern disposed on at least the outside surface of the cover fabric.

3. The barrier garment according to claim 1, wherein said garment includes a configuration to cover the lower body of the wearer.

4. The barrier garment according to claim 3, wherein said garment includes leg sections with said textile being disposed in said leg sections.

5. The barrier garment according to claim 3, wherein said garment includes a pelvic region with said textile being disposed in said pelvic region.

6. The barrier garment according to claim 1, wherein said garment includes a configuration to cover the upper body of the wearer.

7. The barrier garment according to claim 6, wherein said garment includes arm sections with said textile being disposed in said arm sections.

8. The barrier garment according to claim 6, wherein said garment includes an upper torso region with said textile being disposed in said upper torso region.

9. The barrier garment according to claim 1, wherein said garment includes a configuration to cover the head of the wearer.

10. The barrier garment according to claim 9, wherein said garment includes a veil region to cover the face of the wearer, and wherein said veil region includes only the over fabric of said textile.

11. The barrier garment according to claim 9, wherein said garment includes a veil region to cover the face of the wearer, and wherein said garment includes the textile having a more open construction in the veil region.

12. The barrier garment according to claim 9, wherein said garment includes a veil region in the area of the face of the wearer, and wherein said veil region is open.

13. The barrier garment according to claim 1, wherein said garment includes a configuration to cover a hand of the wearer.

14. The barrier garment according to claim 13, wherein the configuration of the garment covering the hand of the wearer is a glove.

15. The barrier garment according to claim 13, wherein the configuration of the garment covering the hand of the wearer is a mitten.

16. The barrier garment according to claim 13, wherein said garment includes openings which allow the fingers and thumb of the wearer to extend through the garment.

17. The barrier garment according to claim 13, wherein the garment includes a second material for the portion of the garment covering the fingers of the wearer.

18. The barrier garment according to claim 13, wherein the garment includes a second material for the portion of the garment covering the palm of the wearer.

19. The barrier garment according to claim 1, wherein said base fabric is an open mesh fabric.

20. The barrier garment according to claim 1, wherein said base fabric is a net construction fabric.

21. The barrier garment according to claim 1, wherein said base fabric is a solid construction fabric.

22. The barrier garment according to claim 1, wherein said base fabric is a fabric selected from the group consisting of: woven, knitted, and nonwoven.

23. The barrier garment according to claim 1, wherein said cover fabric is a solid construction fabric.

24. The barrier garment according to claim 1, wherein said cover fabric has open interstices with a maximum passable width of up to about 0.188 inches.

25. The barrier garment according to claim 24, wherein said base fabric has open interstices with a minimum passable width of about 0.188 inches.

26. The barrier garment according to claim 1, wherein said cover fabric has open interstices with a maximum passable width of up to about 0.063 inches.

27. The barrier garment according to claim 26, wherein said base fabric inches. has open-interstices with a minimum passable width of up to about 0.063 inches.

28. The barrier garment according to claim 1, wherein said spacer layer connects said base layer and said cover layer.

29. The barrier garment according to claim 1, wherein said base fabric, said cover fabric and said spacer layer are sewn together.

30. The barrier garment according to claim 1, wherein said base fabric, said cover fabric and said spacer layer are bonded together.

31. The barrier garment according to claim 1, wherein said base fabric, said cover fabric and said spacer layer are welded together.

32. The barrier garment according to claim 1, wherein the distance between the inside surface of said base fabric and the outside surface of the cover fabric is greater than about one millimeter.

33. The barrier garment according to claim 1, wherein the distance between the inside surface of said base fabric and the outside surface of the cover fabric is at least about two millimeters.

34. The barrier garment according to claim 1, wherein the distance between the inside surface of said base fabric and the outside surface of the cover fabric is between about three millimeters and about seven millimeters.

\* \* \* \* \*